(12) United States Patent
Han

(10) Patent No.: US 9,509,155 B2
(45) Date of Patent: Nov. 29, 2016

(54) REMOTELY MONITORABLE MULTI-PORT CHARGING DEVICE

(71) Applicant: Hsu Han, Taipei (TW)

(72) Inventor: Hsu Han, Taipei (TW)

( * ) Notice: Subject to any disclaimer, the term of this patent is extended or adjusted under 35 U.S.C. 154(b) by 226 days.

(21) Appl. No.: 14/521,476

(22) Filed: Oct. 23, 2014

(65) Prior Publication Data

US 2016/0118824 A1    Apr. 28, 2016

(51) Int. Cl.
*H01M 10/46* (2006.01)
*H02J 7/00* (2006.01)

(52) U.S. Cl.
CPC .................... *H02J 7/0044* (2013.01)

(58) Field of Classification Search
CPC ............ H02J 7/0013; H02J 7/1423; H02J 2007/0037; H02J 2007/004; H02J 7/0042; H02J 7/355
USPC ......... 320/106, 110, 111, 114, 125, 132, 160
See application file for complete search history.

(56) References Cited

U.S. PATENT DOCUMENTS

| 9,350,182 | B2* | 5/2016 | Han | H02J 7/0042 |
| 2008/0150480 | A1* | 6/2008 | Navid | H01R 31/06 |
| | | | | 320/113 |
| 2012/0169272 | A1* | 7/2012 | Khalepari | H01R 13/6675 |
| | | | | 320/107 |
| 2013/0086409 | A1* | 4/2013 | Lu | H04L 12/2807 |
| | | | | 713/340 |
| 2014/0111030 | A1* | 4/2014 | Chou | G05F 1/10 |
| | | | | 307/130 |
| 2014/0333263 | A1* | 11/2014 | Stewart | H02J 7/0042 |
| | | | | 320/111 |

\* cited by examiner

*Primary Examiner* — Edward Tso

(57) ABSTRACT

A remotely monitorable multi-port charging device has a circuit board provided with plural current-detecting elements and a processing unit. A charging portion having plural connecting ports is for connecting and charging multiple electronic devices. The connecting ports are electrically connected the current-detecting elements. A transmission unit is electrically connected to the circuit board. The current-detecting elements serve to detect charging currents of the electronic devices and generate detection signals. The transmission unit receives detection signals, and transmits the signals through wired or wireless transmission to a remote monitoring station. The processing unit performs remote control through the transmission unit, and switch charging states of the electronic devices at the connecting ports. The charging states include a fast charging mode, a slow charging mode, an adjustment mode, a power-saving mode and a mis-connection mode. Thereby, the multi-port charging device can manage all the connected electronic devices rapidly and effectively.

11 Claims, 4 Drawing Sheets

REMOTELY MONITORABLE MULTI-PORT CHARGING DEVICE

BACKGROUND OF THE INVENTION

1. Field of the Invention

The present invention relates to charging devices, and more particularly to a remotely monitorable multi-port charging device that is able to charge multiple electronic devices simultaneously, to show real-time charging states, to receive remote setting for charging currents, and to transmit data.

2. Related Art

Portable electronics are widely used in every level of our daily life. Taking data-accessing applications for example, the heavy printed documents can now be saved electronically for convenient and rapid access anytime, anywhere by using such as e-books, tablet computers, notebooks, smart phones and so on. These electronics are generally powered by rechargeable batteries contained therein.

For leveraging the advantage of portable electronics, many schools and organizations have replaced the traditional printed books with some of the above-mentioned devices, and particularly, with e-books. It is known that e-books need to be charged once a day if not more frequently for continuous operation. In a school scenario, it is more preferable to charge students' e-books simultaneously, for example, after school. However, it is often seen that the e-books are left overnight with the charger connected thereto and since the traditional charger is typically unable to tell whether the battery in the connected e-book is fully charged, electric current keeps running between the charger and the e-book (or a different electronic devices, such as a tablet computer) as long as they are connected. Such a charging practice, over time, can cause damage to the components in the e-book and shorten the service life of the e-book, and can also be harmful to the charger itself. In addition, the conventional chargers are only capable of charging and provide no means for data transmission between e-books and other electronic devices. For data transmission, a user has to remove the charger from the e-book and then connect other means to the e-book, thus being inconvenient. Furthermore, the traditional chargers only charge in a single mode, and is not capable of adapting its charging to the current power level of the e-book or electronic device it charges, thus causing the risk of over-charging or losing time in unnecessary charging.

While a multi-port charger has been disclosed for simultaneously charging plural devices, there are still needs for convenient charging unmet. The prior-art multi-port charger uses indication lights thereon to inform charging states, but when such charging is performed during after-school time or off time, as it is usually the case, a person who manage the charging has to be present at the charging site or he/she has no way to see the indication lights and know the charging states, making his/her work inconvenient and time-consuming.

SUMMARY OF THE INVENTION

One objective of the present invention is to provide a remotely monitorable multi-port charging device that supports simultaneous multi-port charging, adopts an easy way to inform on charging states, provides functions for saving energy and protecting its battery, and allows remote monitoring on the charging states.

Another objective of the present invention is to provide a remotely monitorable multi-port charging device that allows remote adjustment of the charging modes from remote monitoring stations, and also functions for synchronous data transmission.

For achieving the foregoing objectives, the disclosed remotely monitorable multi-port charging device has a body that contains a circuit board having a plurality of current-detecting elements and a processing unit that is loaded with a managing program; a charging portion being deposited on one side of the body and including a plurality of connecting ports for connecting and charging the electronic devices, each said connecting port being electrically connected one said current-detecting elements; and a transmission unit being electrically connected to the circuit board of the body and having a transmission element, an Ethernet port and a signal transmitting/receiving end, the transmission element being coupled to the circuit board, the signal transmitting/receiving end being connected to an antenna for transmitting and receiving wireless signals. The current-detecting elements serve at least to detect magnitude of charging currents of the electronic devices and generate detection signals. The signals are transmitted to at least one remote monitoring station by the transmission element through wired transmission using the Ethernet or through wireless transmission using the signal transmitting/receiving end. The remote monitoring station thus can learn the charging states of the electronic devices, and sends signals to the processing unit through the transmission unit to adjust the charging states of the electronic device at the connecting ports. The charging states at least include a fast charging mode, a slow charging mode, an adjustment mode, a power-saving mode and a mis-connection mode. Thereby, the multi-port charging device of the present invention can rapidly and effectively monitor the electronic device connected thereto, allowing charging to be performed in an effort-saving and power-saving way.

According to one preferred embodiment of the present invention, the multi-port charging device further comprises a data port and an extension port, deposited at another side of the body. The extension port serves to connect a second multi-port charging device, so as to provide more available connecting ports. The data port serves to connect a remote device that synchronously updates program data in the electronic devices. The extension port has an RS485 interface, which supports data transmission/reception detection signals to/from a plurality of connecting ports in a one-to-many manner. The data port has a USB interface or a Micro USB interface.

According to another preferred embodiment of the present invention, the remote monitoring station is configured to, through the processing unit, selectively direct the multi-port charging device to perform automatic scanning, power-saving operation, maximum-charging-current setting and a minimum-charging-current setting. When performing automatic scanning, the charging device scans each of the connecting ports, so as to learn the charging states happening at the connecting ports. When performing power-saving operation, the charging device enters its power-saving mode.

According to another preferred embodiment of the present invention, when the multiple electronic devices are connected to the connecting ports, the processing unit, by means of the transmission unit, gets connected to the wired/wireless network of the remote monitoring station, so as to synchronously verifying whether the profile in each of the electronic devices meets the predetermined requirements.

For an electronic device having a non-conforming profile, the processing unit may update it with data provided by the remote monitoring station.

According to another preferred embodiment of the present invention, among the charging states, the fast charging mode relates to outputting a first current in a first duration, and the slow charging mode relates to outputting a second current in the first duration, wherein the first current is greater than the second current. The adjustment mode relates to outputting a third current in the first duration, and the third current is smaller than the second current or equal to zero, while the mis-connection mode relates to null current output.

The disclosed remotely monitorable multi-port charging device uses a plurality of connecting ports to charge multiple electronic devices, and implements the wireless transmission technology to transmit the charging states of all the connecting ports to at least one remote monitoring station in a real-time manner, so that a person at the monitoring station can have off-site recognition of the charging states, and can further, through the managing program of the processing unit, remotely switch the charging mode of any of the connecting ports, or verify and update the profile of the electronic device connected to any of the connecting ports. In addition, the remotely monitorable multi-port charging device can perform data transmission with any electronic device remotely using the wireless transmission technology. Thereby, the present invention effectively improves the traditional chargers by allowing remote recognition of the charging states, remote switching of charging modes, and data transmission data.

DETAILED DESCRIPTION OF THE INVENTION

The present invention discloses a remotely monitorable multi-port charging device 1, for simultaneously charging multiple electronic devices 6, and transmitting the charging states of the electronic device 6 to at least one remote monitoring station 60 that performs monitoring or setting. The electronic devices 6 may be identical or different electronic device 6, such as e-books, mobile phones, laptop computers, tablet computers and other electronic devices using a rechargeable battery.

Figure 1:
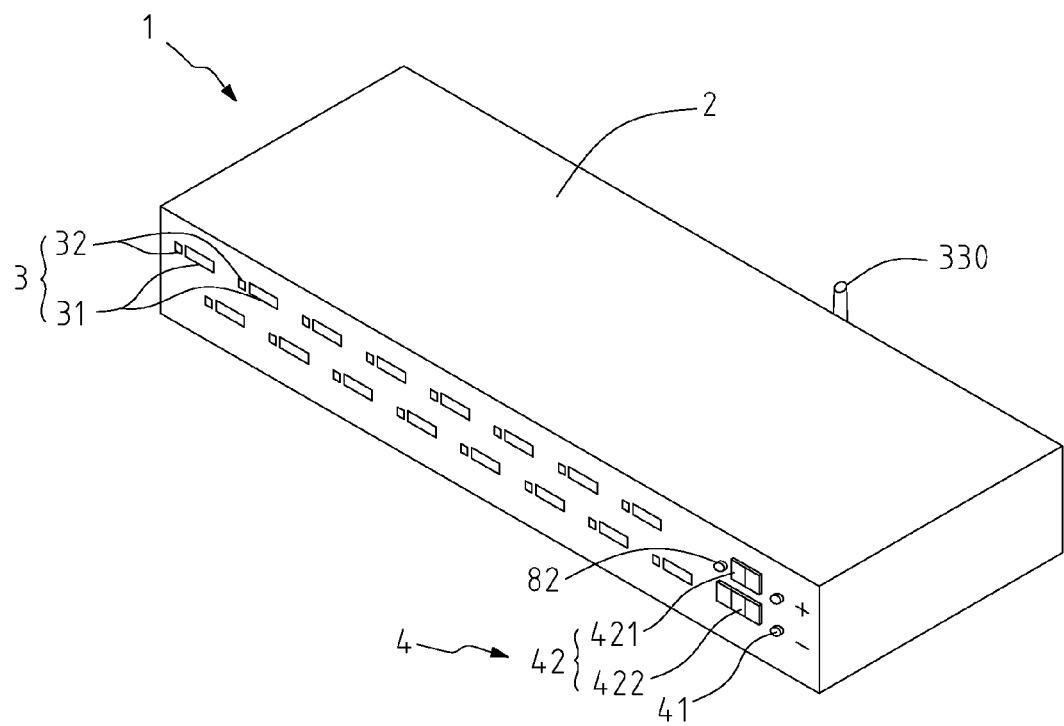
FIG. 1 is a perspective view of a remotely monitorable multi-port charging device according to the present invention.
Figure 2:
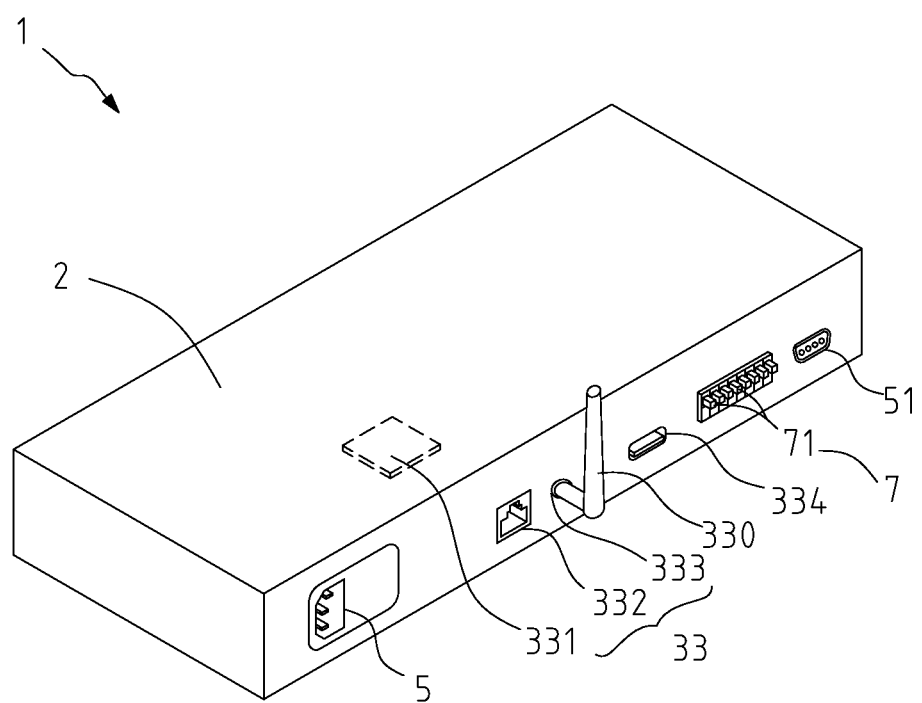
FIG. 2 is another perspective view of the disclosed remotely monitorable multi-port charging device taken from a different viewpoint.
Figure 3:
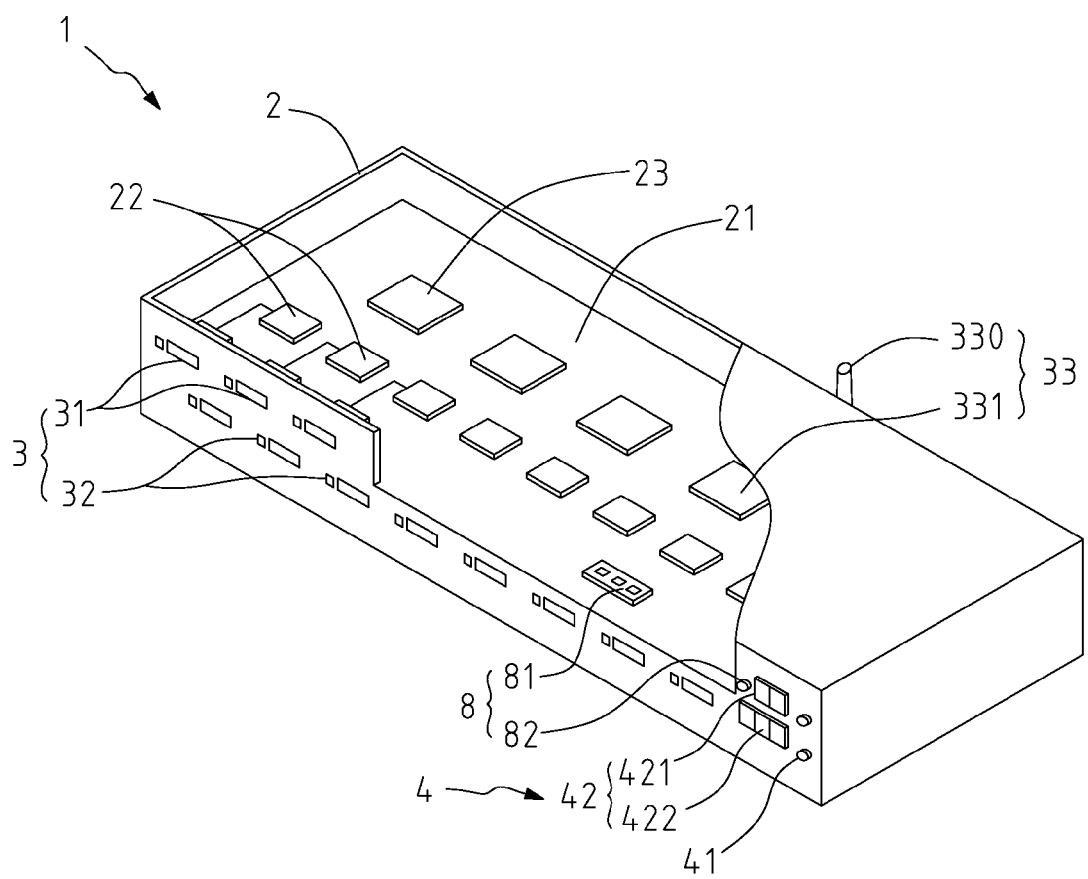
FIG. 3 is a partial, cross-sectional view of FIG. 1.

Referring to FIG. 1 through FIG. 3, in one preferred embodiment of the present invention, the disclosed remotely monitorable multi-port charging device 1 comprises a body 2, a charging portion 3, a transmission unit 33, a controlling portion 4 and a power inlet 5 connected to an external power source. The body 2 is a housing of the disclosed multi-port charging device 1, and contains therein a circuit board 21. The circuit board 21 has a plurality of current-detecting elements 22 and a processing unit 23. Therein, the processing unit 23 may be a microchip, installed therein a managing program 231. At one side of the body 2, there is provided the charging portion 3 and the controlling portion 4, and at another side there are the power inlet 5 and other components as described below.

The charging portion 3 comprises a plurality of connecting ports 31, for connecting the electronic devices 6 to be charged. In the present embodiment, the number of the connecting ports 31 is 16. Each of the connecting ports 31 is associated with a unique port number, i.e. one of the numbers from 01 to 16. In other words, the disclosed remotely monitorable multi-port charging device 1 can simultaneously charge up to 16 electronic devices 6 simultaneously. However, in other embodiments, the number of the connecting ports 31 is not limited to 16 and may vary depending on the practical needs and on the size of the remotely monitorable multi-port charging device 1. In the present embodiment, the connecting ports 31 shown herein are all have the USB interface for connecting electronic devices. However, in other embodiments, they may be a combination of different interfaces. For example, some of the connecting ports 31 may be of the Micro USB interface, some of them may be of the USB interface, and the rest of them may be of the dock connector specification (30-pin), for the use of Apple products (such as Ipad). It is to be noted that each of the connecting ports 31 is equipped with a lamp indicator 32 at one side thereof and is electrically connected to one said current-detecting element 22 (as shown in FIG. 3). In other words, each of the connecting ports 31 and each of the lamp indicators 32 are electrically connected to one said exclusively corresponding current-detecting element 22, so that the current-detecting element 22 can exclusively detect the charging current of one single electronic device.

The transmission unit 33 is electrically connected to the circuit board 21 of the body 2, and comprises a transmission element 331, an Ethernet port 332 and a signal transmitting/receiving end 333. The transmission element 331 is a microchip coupled to the circuit board 21. The signal transmitting/receiving end 333 is located at the back of the body 2, at the same side with the Ethernet port 332 and the power inlet 5. The signal transmitting/receiving end 333 may be directly connected to an antenna 330, or may be indirectly connected to an antenna through a cable, for allowing wireless transmission/reception of signals. The Ethernet port 332 uses an RJ45 network cable to connect a remote monitoring station 60. The remote monitoring station 60 may be a PC.

In addition, the disclosed multi-port charging device 1 further comprises a data port 334 and an extension port 51, both located at the back of the body 2. The extension port 51 has an RS485 interface, for connecting a second multi-port charging device (not shown). In other words, an assembly of two or more of the disclosed multi-port charging devices 1 may be formed using one or more RS485 connectors, thereby providing more available connecting ports 31 to charge more electronic devices. Therein, the RS485 extension port 51 is configured to transmit or receive detection signals of a plurality of connecting ports 31 in a one-to-many manner. However, the interface is not limited to RS485, and may alternatively be a different interface that supports connection and extension.

The data port 334 is a USB interface or a Micro USB interface, for connecting a remote device (not shown). It serves to synchronously update program data in the electronic devices 6. Particularly, the transmission element 331, the Ethernet port 332 and the signal transmitting/receiving end 333 of the transmission unit 33 may be integrated in an external enclosure (not shown). The external enclosure may be connected to the disclosed multi-port charging device 1 through the data port 334 of the USB interface. In this case, the processing unit 23 can automatically determine whether the multi-port charging device 1 is connected to the remote monitoring station through the external enclosure or the Ethernet port 332 of the body 2.

Figure 4:
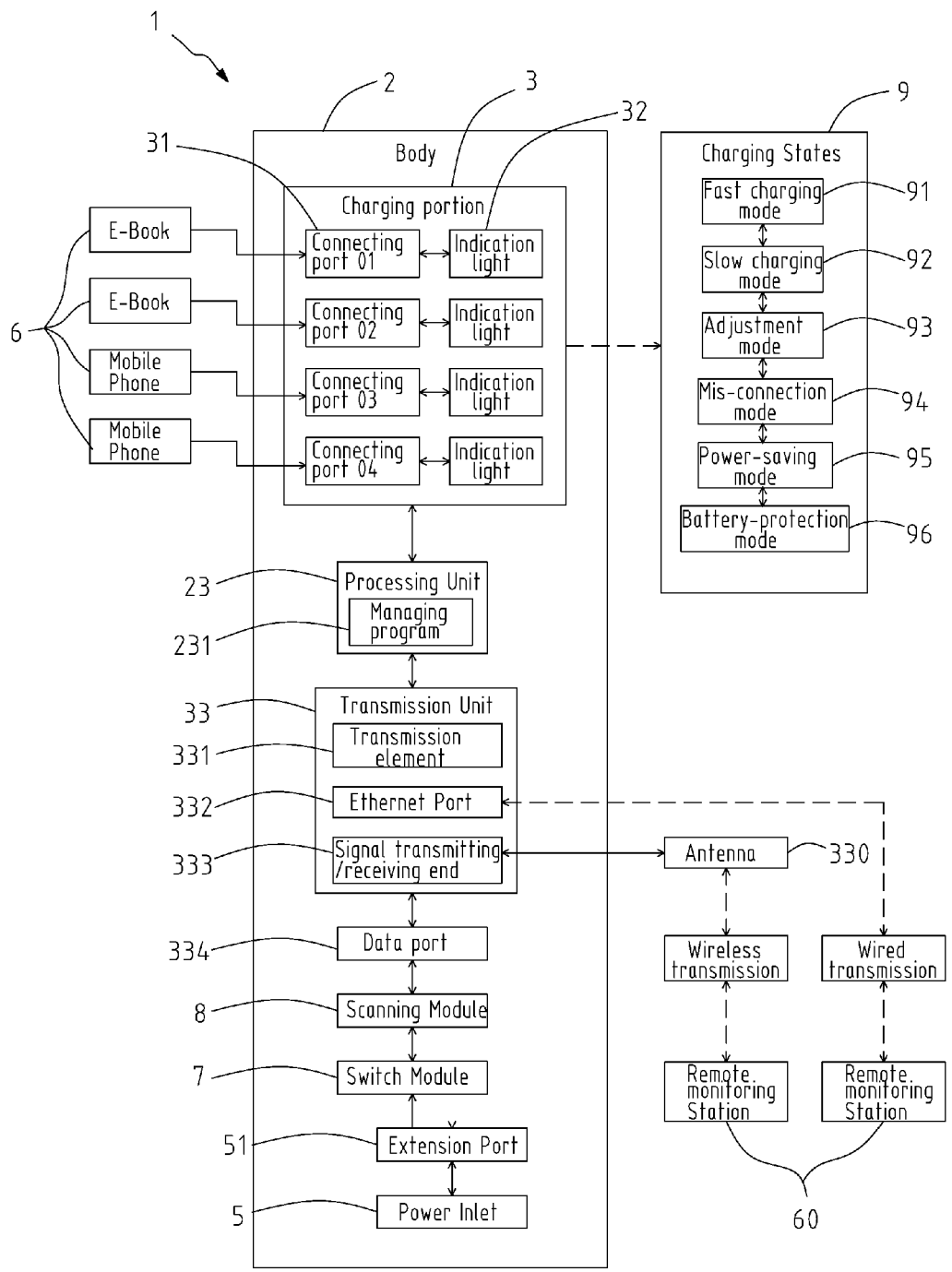
FIG. 4 is a charging diagram of the disclosed remotely monitorable multi-port charging device.

Please refer to FIG. 4 for a charging diagram of the disclosed remotely monitorable multi-port charging device. With the aforementioned components and configuration, when the electronic devices 6 are charged at the connecting ports 31, a plurality of current-detecting elements 22 detect the magnitude of the charging currents of the electronic devices 6, respectively, and feed back detection signals to the indication lights 32, so that each said indication light 32 shows the corresponding charging state 9 according to the signal. The charging states 9 at least includes a fast charging mode 91, a slow charging mode 92, an adjustment mode 93, a mis-connection mode 94 and a power-saving mode 95. It is to be noted that the managing program 231 of the processing unit 23 serves at least to collect the detection signals and transmit them to the transmission element 331 of the transmission unit 33. Then the detection signals are transmitted to at least one remote monitoring station 60 through wired transmission using the Ethernet port 332 or wireless transmission using the signal transmitting/receiving end 333, so that the remote monitoring station 60 can learn the charging states of all the electronic device 6 now being charged. Through a wired or wireless network connection established remotely by the transmission unit 33 and the disclosed multi-port charging device 1, it is possible to switch the charging state 9 of an electronic device 6 at any of the connecting ports 31. In other words, monitoring and setting of the charging states 9, namely the fast charging mode 91, the slow charging mode 92, the adjustment mode 93, the mis-connection mode 94 and the power-saving mode 95, can performed by the remote monitoring station 60. Therein, the wireless transmission may be realized by means of Wi-Fi wireless transmission or other wireless transmission technologies.

In addition, the disclosed remotely monitorable multi-port charging device 1 also serves to verify whether the profiles in the electronic devices 6 at the connecting ports 31 conform to a preset requirement or not. Particularly, when the multiple electronic devices 6 are connected to the connecting ports 31, the processing unit 23 connected to the remote monitoring station 60 (or a remote device) through the wired or wireless network connection built on the Ethernet or the data port 334, synchronously verifies whether the profile in each connected electronic device 6 meets the requirement. If there is any unconformity found, the processing unit 23 updates the profile according to data provided by the remote monitoring station 60. For example, the verification is for checking whether a certain program loaded in the electronic device 6 is the latest version, and when a previous version detected, the wireless transmission connector 332 receives the data about the latest version from the remote monitoring station, and then the processing unit 23 manages the wireless transmission connector 332 to deliver the updated data to the relevant electronic device (s) 6 at the connecting port (s) 31. In another embodiment, the remote monitoring station 60 may directly remove any non-conforming profiles or programs in the electronic device 6.

The fast charging mode 91 refers to outputting a first current in a first duration. The slow charging mode 92 refers to outputting a second current in the first duration. The first current is greater than the second current. The adjustment mode refers to outputting a third current in the first duration, and the third current is smaller than the second current or equal to zero. The mis-connection mode 94 indicates that the electronic device is not correctly connected and therefore is not getting charged. Particularly, the fast charging mode 91 indicates that the remaining power of the electronic device 6 is seriously low, such as lower than a half of its full power level, and thus the charging current is large for quick charging. The slow charging mode 92 indicates that the electronic device 6 still has some power but the power level is not full, so the charging current in the same time interval is smaller than that of the fast charging mode 91. The adjustment mode 93 indicates that the electronic device 6 is fully charged, so the multi-port charging device 1 provides no more charging, meaning that the charging current is zero or kept at a minimum level.

It is to be noted that the remote monitoring station 60 may set a start timing and an end timing for any of the charging modes 91-96 of the charging state 9, so as to further improve the charging efficiency. For example, when the charging state 9 is set as the slow charging mode 92, the remote monitoring station 60 may such set that when the electronic device is charged to 85% of its full capacity, the charging is turned to the adjustment mode 93 or the power-saving mode 95. At this time, the power level of the electronic device 6 is sufficient for its long-term use.

The lamp indicators 32 may be designed to indicate the charging states 9 in many different ways. The lamp indicator 32 may be an LED. In one embodiment, the lamp indicators 32 use different colors to indicate different charging states. In another embodiment, the lamp indicator 32 flashes for the fast charging mode 91 and the slow charging mode 92, and constantly illuminates for the adjustment mode 93, while it remains dark for the mis-connection mode 94. In this way, when a user sees a lamp dark, he/she knows that the connection at the associated port fails and can rebuild the connection correctly. Therein, the lamp indicator 32 flashes more frequently for the fast charging mode 91 than for the slow charging mode 92, thereby distinguishing the two modes. Furthermore, different colors may be assigned for better recognition. Thereby, the disclosed multi-port charging device 1 may perform current detection based on the charging currents and then implement the lamp indicators 32 to show the corresponding charging states 9, for the user to easily and quickly identify whether the electronic device is currently fully charged (the adjustment mode 93), not fully charged (the fast charging mode 91), almost fully charged (the slow charging mode 92) or not connected correctly (the mis-connection mode 94). The multi-port charging device 1 then considers the remaining power level of the electronic device 6 and determines the proper charging current, so as to save power and prevent the electronic device 6 from damage caused by overcharging, in turn protecting the electronic device.

Still referring to FIG. 1, the disclosed remotely monitorable multi-port charging device 1 further comprises a controlling portion 4, which is deposited besides the charging portion 3, and includes a setting element 41 and a displaying element 42. The setting element 41 may be a set of setting keys, or a knob (not shown). The displaying element 42 includes plural screens 421 and 422 arranged vertically. In another embodiment, the displaying element 42 is a screen, such as a small-size LCD (not shown). Another feature of the present invention is that the setting element 41 serves to select any of the connecting ports 31, and the displaying element 42 serves to show the port number and the corresponding charging current of the selected connecting port 31. In practical operation, pressing the setting keys of the setting element 41 allows the screen 421 to show the port number of the selected connecting port 31, such as the port number 10. By pressing the setting element 41 again, the port number can be increased or decreased until the port number of the targeted connecting port 31 is reached. At the same time, the other screen 422 shows the charging current of the selected connecting port 31. For example, by showing "1400 mA", the screen 422 informs the user of a charging current of 1.40 ampere. Thereby, the user can get the charging state from the lamp indicator 32, and further get the accurate value of the charging current of the connecting port 31 from the displaying element 42. In addition, the setting element 4 may be also used to set the maximum current and the minimum current for the selected connecting port. The settings may be determined according to the electronic device to be charged, and done in the way described above. Particularly, the user can select a certain said connecting port 31, and press the setting keys of the setting element 41 to increase or decrease the value to be set as the maximum or minimum current for charging. The purposes of protecting the device's battery and saving power can be both satisfied by setting the maximum and minimum currents. The setting element 4 can set the maximum and minimum currents for the connecting ports 31 individually or collectively in one operation.

Additionally, in the disclosed remotely monitorable multi-port charging device, the power-saving mode 95 has a battery-protection mode 96. When the current-detecting element 22 detects that the electronic device 6 has entered its sleeping mode and is therefore in a power-saving state, the disclosed remotely monitorable multi-port charging device 1 does not charge the electronic device 6. However, there is a chance that the electronic device 6 has long stayed in its sleeping mode and its battery power finally comes to an extremely low level that may be adverse to the battery. For preventing such battery damage, when the current-detecting element 22 detects the electronic device in the power-saving state has its remaining power level lower than a bottom limit, such as 10% of its full power level, the charging portion 3 automatically starts to charge, thereby securing the battery of the electronic device from damage caused by an extremely low power level.

Instill another embodiment, when any of the connecting ports 31 in the charging portion 3 is not connected to an electronic device, the vacant connecting port 31 has its charging state enter the power-saving mode 95, where the charging function is turned off, so as to save power consumption of the disclosed remotely monitorable multi-port charging device 1 itself.

Now referring to FIG. 3, the disclosed remotely monitorable multi-port charging device 1 further comprises a scanning module 8 for performing automatic scanning. The scanning module 8 at least includes a scanning element 81 and a scanning indicator 82. The scanning element 81 serves to automatically scan the connecting ports 31 one by one in a periodic manner, so as to detect the charging state of each said connecting port 31, and show the port number and the charging current of the currently scanned connecting port 31 through the displaying element 42. The scanning indicator 82 serves to indicate that the scanning module 8 is performing automatic scanning. The interval of the scanning is programmable according to practical needs, and may cause the connecting ports 31 to be scanned every 5 seconds, 10 seconds, 30 seconds or 60 seconds automatically. With this function, the user is free from manually selecting the connecting ports 31 to be scanned through the controlling portion 4, and monitoring the charging states of the ports can become more efficient. In addition, the processing unit 23 may be controlled by the remote wireless transmission to make the remotely monitorable multi-port charging device 1 perform automatic scanning, power-saving operation, maximum-charging-current setting and minimum-charging-current setting. Therein, the power-saving operation means to activate the power-saving mode 95.

Please refer back to FIG. 2, in addition to the remote mode-switching as described above, the multi-port charging device 1 may further include a switch module 7 on the body 2 beside the power inlet 5. The switch module 7 has a plurality of toggle switches 71 that alternatively serve to activate the automatic scanning of the scanning module 8, and switch among power-saving operation, maximum-current setting and minimum-current setting for the power-saving mode 95.

Accordingly, the disclosed remotely monitorable multi-port charging device 1 uses the connecting ports 31 to charge the electronic devices 6, and implements the wireless or wired transmission technology to transmit the charging states happening at the connecting ports 31 to at least one remote monitoring station, thereby allowing the monitoring station to recognize the charging states off-site. Moreover, by using the managing program 231 of the processing unit 23, the charging mode at any of the connecting ports 31 can be switched remotely, and the profiles in the electronic devices 6 connected to the connecting ports 31 can be verified and updated synchronously. Also, the disclosed remotely monitorable multi-port charging device 1 can perform wireless or wired data transmission on any electronic device 6 remotely. The disclosed remotely monitorable multi-port charging device 1 thus realizes not only simultaneous charging of multiple device, but also wireless or wired connotation between a remote monitoring station and electronic devices 6 connected to the connecting ports 31. Thereby, the present invention effectively improves the traditional chargers by allowing remote recognition of the charging states, remote switching of charging modes, and data transmission data.

It is understood that the invention may be embodied in other forms within the scope of the claims. Thus the present examples and embodiments are to be considered in all respects as illustrative, and not restrictive, of the invention defined by the claims.

What is claimed is:

1. A remotely monitorable multi-port charging device for charging plural electronic devices simultaneously, the remotely monitorable multi-port charging device comprising:

a body, containing therein a circuit board that is provided with a plurality of current-detecting elements and a processing unit, in which a managing program is installed;

a charging portion, being deposited at one side of the body and including a plurality of connecting ports, each connected to one said electronic device to be charged; and a transmission unit, being electrically connected to the circuit board of the body, and having a transmission element, an Ethernet port and a signal transmitting/receiving end, wherein the transmission element is coupled to the circuit board, and the signal transmitting/receiving end is connected to an antenna for transmitting/receiving wireless signals;

wherein the current-detecting elements being at least configured to detect magnitude of charging currents for the electronic devices and generate detection signals, which are transmitted by the transmission element in a wired manner through the Ethernet or in a wireless manner through the signal transmitting/receiving end to at least one remote monitoring station, so as to inform the remote monitoring station of how each of the electronic devices is charged, and the transmission unit transmitting the signals to the processing unit so as to switch charging states of the electronic devices at the connecting ports, in which the charging states at least include a fast charging mode, a slow charging mode, an adjustment mode, a power-saving mode and a mis-connection mode.

2. The remotely monitorable multi-port charging device of claim 1, further comprising a data port and an extension port deposited at another side of the body, in which the extension port serves to connect a second multi-port charging device for providing more said connecting ports, and the data port serves to connect a remote device that is configured to synchronously update data in the electronic devices.

3. The remotely monitorable multi-port charging device of claim 2, wherein the extension port has an RS485 interface that transmits and receives the detection signals of the connecting ports in a one-to-many manner, and the data port has a USB interface or a Micro USB interface.

4. The remotely monitorable multi-port charging device of claim 1, wherein the remote monitoring station is configured to, through the processing unit, direct the multi-port charging device to perform automatic scanning, power-saving operation, maximum-charging-current setting or minimum-charging-current setting, in which the automatic scanning scans the connecting ports so as to detect the charging state at each said connecting port, and the power-saving operation activates the power-saving mode.

5. The remotely monitorable multi-port charging device of claim 1, wherein when the multiple electronic devices are connected to the connecting ports, the processing unit through the transmission unit and wired or wireless network connection of the remote monitoring station, synchronously verifies whether data in each of the connected electronic devices conforms with a preset requirement or not, and if any unconformity is detected, the processing unit uses data provided by the remote monitoring station to update the relevant electronic devices.

6. The remotely monitorable multi-port charging device of claim 1, wherein each of the connecting ports is associated with an indication light that displays the corresponding charging state according to the detection signal.

7. The remotely monitorable multi-port charging device of claim 1, wherein the fast charging mode relates to outputting a first current in a first duration, and the slow charging mode relates to outputting a second current in the first duration, in which the first current is greater than the second current, and the adjustment mode relates to outputting a third current in the first duration, in which the third current is smaller than the second current or equal to zero, while the mis-connection mode relates to null current output.

8. The remotely monitorable multi-port charging device of claim 1, wherein the charging states further include a battery-protecting mode in addition to the power-saving mode, so that when the current-detecting element detects that the electronic device in the power-saving state has a remaining power level lower than a bottom limit, the multi-port charging device automatically charges the electronic device, thereby preventing the electronic device from battery damage caused by low power, and when the current-detecting element detects that the electronic device in the power-saving state has a remaining power level higher than the bottom limit, the multi-port charging device is switched to the power-saving mode and disables charging thereof.

9. The remotely monitorable multi-port charging device of claim 1, wherein when one of the connecting ports of the charging portion is not connected to one said electronic device, the multi-port charging device enters the vacant connecting port into the charging state of the power-saving mode, and disables charging thereof.

10. The remotely monitorable multi-port charging device of claim 1, further comprising a controlling portion, which has a setting element and a displaying element, wherein each said connecting port has a unique port number, so that one of the connecting ports is allowed to be selected by the setting element, and the displaying element then shows the port number of the selected connecting port and a charging current associated therewith, for the setting element to perform maximum-charging-current setting or minimum-charging-current setting.

11. The remotely monitorable multi-port charging device of claim 1, further comprising a scanning module, which at least includes a scanning element and a scanning indicator, wherein the scanning element serves to perform automatic scanning on the connecting ports in a periodic manner, so as to automatically detect the charging state of each of the connecting ports, and show the port numbers and the charging currents of the scanned connecting ports through the displaying element, and the scanning indicator serves to indicate that the scanning module is performing the automatic scanning.

* * * * *